United States Patent
Nguyen

(10) Patent No.: US 8,190,753 B2
(45) Date of Patent: May 29, 2012

(54) SYSTEM AND METHOD FOR PROTECTING EMERGENCY RESPONSE SERVICES IN TELECOMMUNICATION NETWORKS FROM ATTACK

(75) Inventor: Nhut Nguyen, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 11/510,938

(22) Filed: Aug. 28, 2006

(65) Prior Publication Data

US 2008/0052399 A1 Feb. 28, 2008

(51) Int. Cl.
*G06F 15/16* (2006.01)

(52) U.S. Cl. ........ 709/229; 709/225; 709/227; 713/185; 726/9

(58) Field of Classification Search .................. 709/225, 709/227; 713/185; 726/9
See application file for complete search history.

(56) References Cited

U.S. PATENT DOCUMENTS

| | | | |
|---|---|---|---|
| 6,360,254 B1* | 3/2002 | Linden et al. .................. 709/219 |
| 7,079,627 B2* | 7/2006 | Crago et al. ..................... 379/45 |
| 7,245,901 B2* | 7/2007 | McGregor et al. ............ 455/406 |
| 7,451,921 B2* | 11/2008 | Dowling et al. .............. 235/380 |
| 7,478,245 B2* | 1/2009 | Allen ............................ 713/185 |
| 7,555,460 B1* | 6/2009 | Barkan ............................. 705/39 |
| 2001/0016035 A1* | 8/2001 | Manner .................... 379/115.01 |
| 2002/0016838 A1* | 2/2002 | Geluc et al. .................... 709/224 |
| 2004/0022237 A1* | 2/2004 | Elliott et al. .................. 370/356 |
| 2004/0174855 A1* | 9/2004 | Foster et al. .................. 370/348 |
| 2005/0021761 A1* | 1/2005 | Thomas ......................... 709/227 |
| 2005/0084082 A1* | 4/2005 | Horvitz et al. ........... 379/114.06 |
| 2005/0105464 A1* | 5/2005 | Acharya et al. ............... 370/229 |
| 2005/0132060 A1* | 6/2005 | Mo et al. ........................ 709/227 |
| 2005/0135388 A1* | 6/2005 | Hartikainen et al. .......... 370/401 |
| 2005/0201364 A1* | 9/2005 | Dalton et al. .................. 370/352 |
| 2005/0201529 A1* | 9/2005 | Nelson et al. ..................... 379/45 |
| 2006/0043164 A1* | 3/2006 | Dowling et al. .............. 235/375 |
| 2006/0155715 A1* | 7/2006 | Duffek et al. ................. 707/100 |
| 2006/0165068 A1* | 7/2006 | Dalton et al. .................. 370/352 |
| 2007/0100981 A1* | 5/2007 | Adamczyk et al. ........... 709/223 |
| 2007/0135088 A1* | 6/2007 | Alessandro ................ 455/404.1 |
| 2007/0211867 A1* | 9/2007 | Polk et al. ........................ 379/45 |
| 2008/0010674 A1* | 1/2008 | Lee ................................... 726/7 |
| 2009/0080416 A1* | 3/2009 | Battistello et al. ............ 370/356 |

OTHER PUBLICATIONS

H. Schulzrinne et al. "Providing Emergency Services in Internet Telephony." IEEE Internet Computing. Pub. Date: May-Jun. 2002.*
W Marshall et al. "SIP Extensions for Media Authorization." Pub. Date: May 2002.*
H. Schulzrinne. "Emergency Calling for VoIP." Pub. Date: Jan. 2004.*

* cited by examiner

*Primary Examiner* — Krista Zele
*Assistant Examiner* — James Forman

(57) ABSTRACT

The present disclosure relates generally to systems and methods for protecting emergency response services in telecommunications systems from attack. In one example, a system may include a network, a token generator, and a token validator. The network may be configured to communicate with a client via a network interface. The token generator is coupled to the network and configured to generate at least one token based on information associated with the client. The token contains sufficient information for the network to independently validate the client when an emergency response service request is sent by the client to the network. The token validator is coupled to the network and configured to perform a validation process on the token when the token is sent by the client to the network over the network interface. The network is configured to connect the emergency response service request only if the token is validated.

22 Claims, 4 Drawing Sheets

SYSTEM AND METHOD FOR PROTECTING EMERGENCY RESPONSE SERVICES IN TELECOMMUNICATION NETWORKS FROM ATTACK

BACKGROUND

Telecommunication networks are evolving from the use of circuit switched technologies to the use of packet based technologies such as the Internet Protocol (IP). As network infrastructures begin to support such packet technologies, protecting network services from security attacks is becoming an increasingly important issue. One reason for this is that packet networks tend to be more vulnerable to attacks than traditional circuit-switched networks. For example, Voice over IP (VoIP) is a voice communication technology that uses an IP based infrastructure, and voice communications in IP-based networks that use VoIP technology may be susceptible to security attacks such as voice spam or denial of service.

Emergency response services, commonly known as E911 service in the United States, provide an important function that needs to be protected from spam or other packet based attacks. If not protected, voice spam and other security attacks may render an emergency response service unavailable. Generally, one of the challenges in providing emergency response services is that such services should ideally be available to all terminals and users when needed. In addition, due to the urgency of many emergency response service requests, delays in fulfilling a request should be minimized. Current methods and systems do not adequately meet these and other needs, and improvements are needed in protecting emergency response services in networks using packet based technologies.

SUMMARY

In one embodiment, a method comprises sending information identifying a terminal device to a token generator in a communication network. At least one token is generated by the token generator based on the information, wherein the token is for use by the terminal device when placing an emergency call and contains sufficient validation information to uniquely identify the terminal device in the communication network. The token is sent to the terminal device. The token is received from the terminal device with a request from the terminal device to establish the emergency call. The method attempts to validate, by a token validator within the communication network, the token prior to establishing the emergency call. The emergency call is established only if the attempt to validate the token is successful.

In another embodiment, a method comprises receiving a request for a connection to an emergency response service from a terminal device. A token is received from the terminal device, wherein the token uniquely identifies the terminal device in a communication network without the need for other communications between the terminal device and the communication network. The communication network determines whether the token is valid and connects the terminal device to the emergency response service only if the token is valid.

In still another embodiment, a method for use with a terminal device comprises receiving at least one token from a communication network, wherein the token includes validation information uniquely associated with the terminal device that is sufficient to identify the terminal device to the communication network without additional information from the terminal device. The token is stored in a memory. The token is retrieved from the memory and sent to the communication network when requesting a connection to an emergency response service.

In yet another embodiment, a system comprises a network, a token generator, and a token validator. The network is configured to communicate with a client via a network interface. The token generator is coupled to the network and configured to generate at least one token based on information associated with the client, wherein the token contains sufficient information for the network to independently validate the client when an emergency response service request is sent by the client to the network. The token validator is coupled to the network and configured to perform a validation process on the token when the token is sent by the client to the network over the network interface, wherein the network is configured to connect the emergency response service request only if the token is validated.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
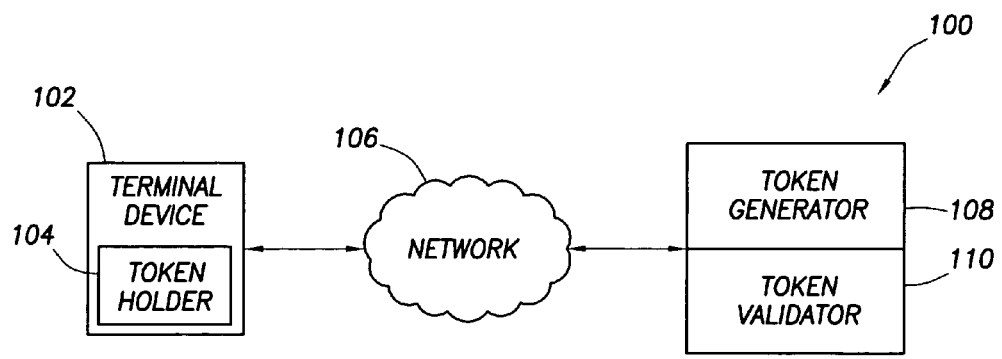
FIG. 1 is a block diagram of one embodiment of a system that may be used to provide protection for emergency response services.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a system 100 is illustrated that may be used to protect emergency response services from attacks such as voice spam. As is known, spam attacks aim at rendering network services unavailable by exhausting network resources with invalid and spurious service requests. Such attacks may consume available network resources for responding to emergency response service requests, rendering such services unavailable. However, because of the urgent nature of many emergency call requests, some protection mechanisms may be inappropriate for protecting emergency response services. For example, user and client authentication mechanisms may have limited use because they may take too much time to authenticate a request or to validate a request against a database during an emergency call. Furthermore, protecting emergency response services in a packet based network is challenging because any terminal device or client may be a potential attacker. The system 100 may be used to protect an emergency response service from attacks by minimizing invalid and spurious requests without requiring intensive computation for authentication and validation.

Accordingly, in the present example, a client such as a terminal device 102 may include a token holder 104 that may be used to store a plurality of tokens. As will be described later in greater detail, the tokens may be issued to the terminal device 102 for emergency call purposes by a token generator 108 coupled to or included within a network 106. Each token may uniquely identify the terminal device 102 within the network 106. In order to request an emergency response service, the terminal device 102 may be required to send a token from the token holder 104 to the network 106. A token validator 110 coupled to or included within the network 106 may be used to validate the token. The network 106 may discard or otherwise reject the emergency response service request if no token is received from the terminal device 102 or if the token validator 110 fails to validate the token.

If the emergency service response request is granted and the call is verified as a real emergency call, a replacement token may be generated by the token generator 108 and sent to the terminal device 102 via the network 106. If the call is determined to be a false emergency call (e.g., the call is not about a real emergency), no replacement token may be generated. In this manner, the terminal device 102 may be able to make requests for emergency response services based on the number of tokens stored in the token holder 102. False requests for emergency response services may use a token without generating a replacement token, so the number of tokens limits the number of false emergency response service requests that the terminal device 102 can make.

Accordingly, the network-issued tokens may be used to prevent the terminal device 102 from flooding the network with packet based emergency response service requests while permitting valid emergency response service requests to be fulfilled. It is understood that the term "packet", as used in the present disclosure, may include any type of encapsulated information, including datagrams, frames, packets, and the like, and the encapsulated information may include voice, video, data, and/or other encapsulated information.

Figure 2:
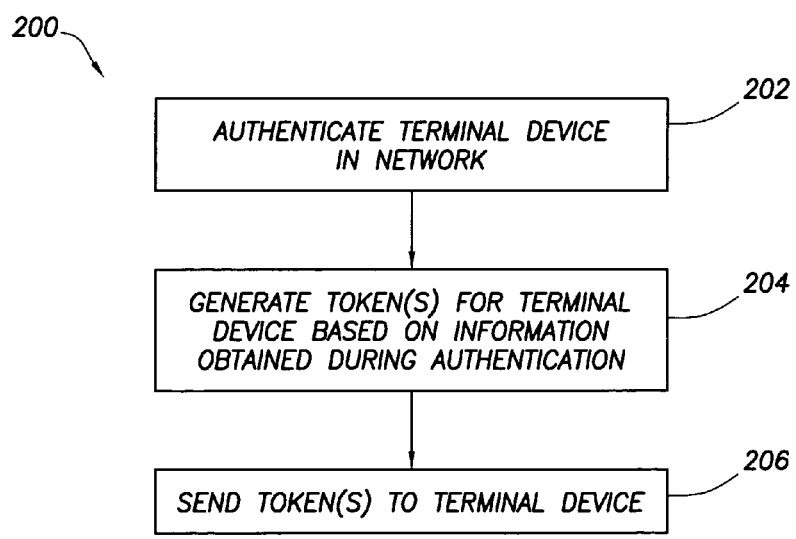
FIG. 2 is a flowchart illustrating one embodiment of a method for generating one or more tokens that may be used in the system of FIG. 1.

Referring to FIG. 2, in one embodiment, a method 200 may be used to generate tokens for a terminal device, such as the terminal device 102 of FIG. 1. The method 200 may be executed at least in part by a token generator (e.g., the token generator 108 of FIG. 1).

In step 202, the terminal device 102 authenticates with the network 106 (FIG. 1). For example, the authentication may occur during a power-up sequence of the terminal device 102 or during a network registration procedure. During authentication, the terminal device 102 may send information to the token generator 108. The information may include a user identity (e.g., username) and device signature information, such as a Media Access Control (MAC) number of the terminal device's network interface (e.g., a wired or wireless interface) or information associated with a Subscriber Identity Module (SIM) of the terminal device. It is understood that this information may also be obtained by the network 106 and sent to the token generator 108.

In step 204, the token generator 108 may generate one or more tokens for the terminal device 102 based on the information obtained in step 202. The token generator 108 uses the information and a mathematical process to generate a number of tokens unique to the terminal device 102 and, in some embodiments, unique to a particular user of the terminal device. For example, the mathematical process may use a simple hashing algorithm (e.g., MD5 or SHA) that computes a digest of the information received from the terminal device 102. For stronger protection, encryption and/or other processes may be used. For example, a process may be used that inserts a randomly chosen value that is different from previous choices into a token to protect against reuse (e.g., a nonce).

Because the token generator 108 incorporates validation information into each token, the terminal device 102 does not have to perform validation computations. This avoids the need for the terminal device 102 to become involved in validation of the token and so avoids the need for communication between the terminal device and the token validator 110. As such, delay is minimized as there is no need to exchange information other than the token itself when an emergency response service request is initiated.

Accordingly, a variety of processes may be used to generate tokens that are unique to the terminal device 102. In the present embodiment, each token generated for the terminal device 102 may differ from the other tokens generated for the terminal device, but in other embodiments the tokens may be the same for a particular terminal device. As tokens may be generated for a specific user, each user of the terminal device 102 may have a separate token holder 104 or tokens in a single token holder may be identified by user so that the terminal device can select an appropriate token for a particular user. Alternatively, tokens may be associated only with the terminal device 102 and all users may share a single token holder 104.

In step 206, the tokens may be sent to the terminal device 102 for storage in the token holder 104. In the present example, each token may only be used once and, as tokens do not expire, they may remain in the token holder until used. In other embodiments, the tokens may include a time limit or other expiration mechanism, and additional tokens may be generated by the token generator 108 to replace expired tokens. Furthermore, in some embodiments, rather than generating a replacement token, a token received by the network 106 from the terminal device 102 for an emergency call may be modified and sent back to the terminal device for reuse.

The terminal device 102 may also contain an indicator to notify a user that the terminal device is low on tokens or out of tokens. Such an indicator may be visual or audio and would notify the user to contact the network provider to obtain additional tokens.

Figure 3:
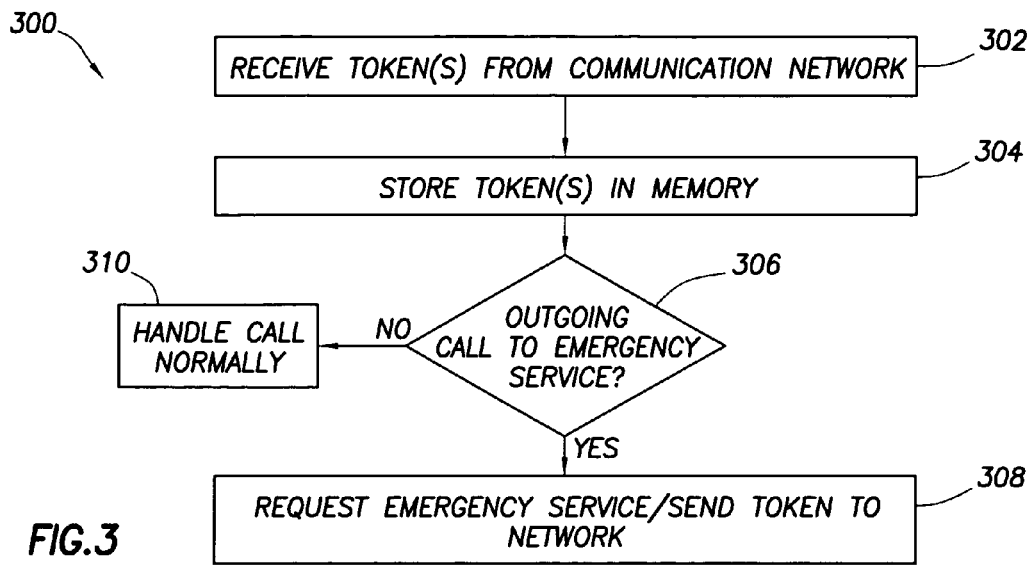
FIG. 3 is a flowchart illustrating one embodiment of a method that may be used by a terminal device in the system of FIG. 1 to connect to an emergency response service using a token.

Referring to FIG. 3, in one embodiment, a method 300 may be used by a terminal device (e.g., the terminal device 102 of FIG. 1) to receive tokens from a network and later request an emergency response service. In step 302, the terminal device 102 may receive one or more tokens from the network 106 (FIG. 1). As described previously, the tokens may be required to place an emergency response service call using the network 106. In step 304, the terminal device 102 may store the tokens in a memory such as the token holder 104 (FIG. 1).

In step 306, when an outgoing call is detected, the terminal device 102 may determine whether the outgoing call is for an emergency response service. For example, if the outgoing call is a 911 call in the United States, the terminal device 102 may identify it as an emergency response service call. It is understood that various numbers may be identified as emergency response service call numbers. For example, upon authentication with the network 106, the terminal device 102 may receive a list of numbers that require a token within the network.

Although not illustrated in FIG. 3, other factors may determine whether a token is required. For example, the terminal device 102 may determine whether the outgoing emergency response service call is a VoIP call and may require a token only if VoIP is being used. Accordingly, tokens may be used only for calls using a technology that enables an attack such as a voice spam attack to be mounted on the network 106.

If it is determined in step 306 that the outgoing call is for an emergency response service (and any other applicable criteria are satisfied), the method 300 continues to step 308, where a request for a connection to the emergency response service is sent to the network 106 with the token. It is understood that the token may be sent with the request (e.g., encapsulated within a message containing the request) or separately (e.g., in a separate message before or after a message containing the request). If the outgoing call is not for an emergency response service, the method 300 may continue to step 310 and process the call normally.

Figure 4:
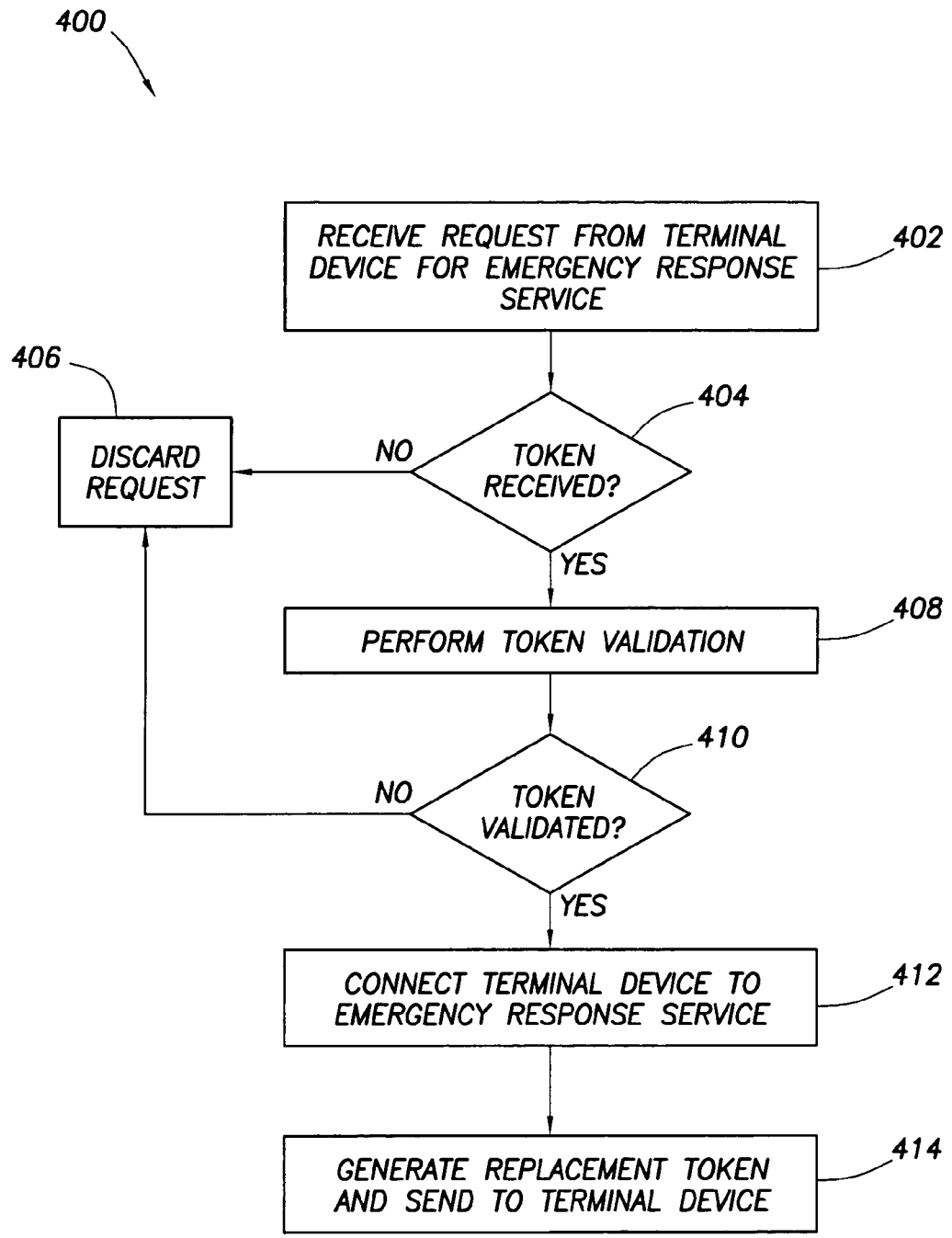
FIG. 4 is a flowchart illustrating one embodiment of a method that may be used in the system of FIG. 1 to provide protection for emergency response services.

Referring to FIG. 4, in another embodiment, a method 400 may be executed within a network (e.g., the network 106 of FIG. 1) to protect emergency response services against attacks. In the present example, it is understood that the token validator 110 of FIG. 1 is coupled to or included within the network 106.

The present embodiment assumes that tokens have already been generated and sent to the terminal device 102 using, for example, the method 200 of FIG. 2 described previously. If the terminal device 102 does not already contain at least one token, one or more tokens may be generated and sent to it as previously described.

In step 402, the network 106 receives a request for an emergency service from the terminal device 102. In step 404, a determination may be made as to whether a token corresponding to the request was received from the terminal device 102. As has been described previously, the token may be issued by the network 106 to the terminal device 102 for emergency call purposes and may contain sufficient information to uniquely identify the terminal device within the network and to serve as independent validation of an emergency response service request. If no token corresponding to the request has been received, the request may be discarded in step 406. If a token was received, the network 106 may validate the token in step 408 using the token validator 110. As the token has been uniquely issued to the terminal device 102, validating the token as authentic may serve to validate the emergency response service request without the need for additional authentication processes.

In step 410, a determination may be made as to whether the token was validated. If it was, the method 400 may continue to step 412, where the network 106 may connect the terminal device 102 to the requested emergency response service. The network 106 may then generate a replacement token (e.g., using the token generator 108 of FIG. 1) and send the replacement token to the terminal device 102 in step 414. This prevents the terminal device 102 from running out of tokens due to valid requests for emergency response services. In some embodiments, additional validation of the request may be performed prior to sending the replacement token. For example, the network 106 may validate that the call was for an actual emergency.

If it is determined in step 410 that the token has failed the validation process, the method 400 discards the request in step 406 before network resources are consumed for the call. Accordingly, the method 400 may protect emergency services by allowing only emergency calls that are accompanied by a valid token. It is understood that, in some embodiments, a token may not be required. For example, if the call is not a VoIP call, the network 106 may be configured to allow the call without needing a token. In this manner, emergency response services using technologies susceptible to attack (e.g., packet based technologies) may be protected through the use of tokens, while emergency response services using technologies less susceptible to attack may not need a token.

Accordingly, a user (either authorized or unauthorized) may send spurious and invalid emergency service requests to the network 106 with invalid tokens or without a valid token to spam an emergency response service. However, the use of tokens and a token validation process ensures that these requests will be quickly detected and discarded before they can consume more than minimal network resources. Alternatively, the terminal device 102 may be hijacked and the valid tokens contained in the token holder 104 may be used to mount an attack. In this case, only the hijacked terminal device 102 is affected, as the tokens will quickly be exhausted and the terminal device will be unable to send more requests for emergency response services. The previously described indicator may alert the user that the token holder 104 is empty and the user may be notified that a problem has occurred.

Figure 5:
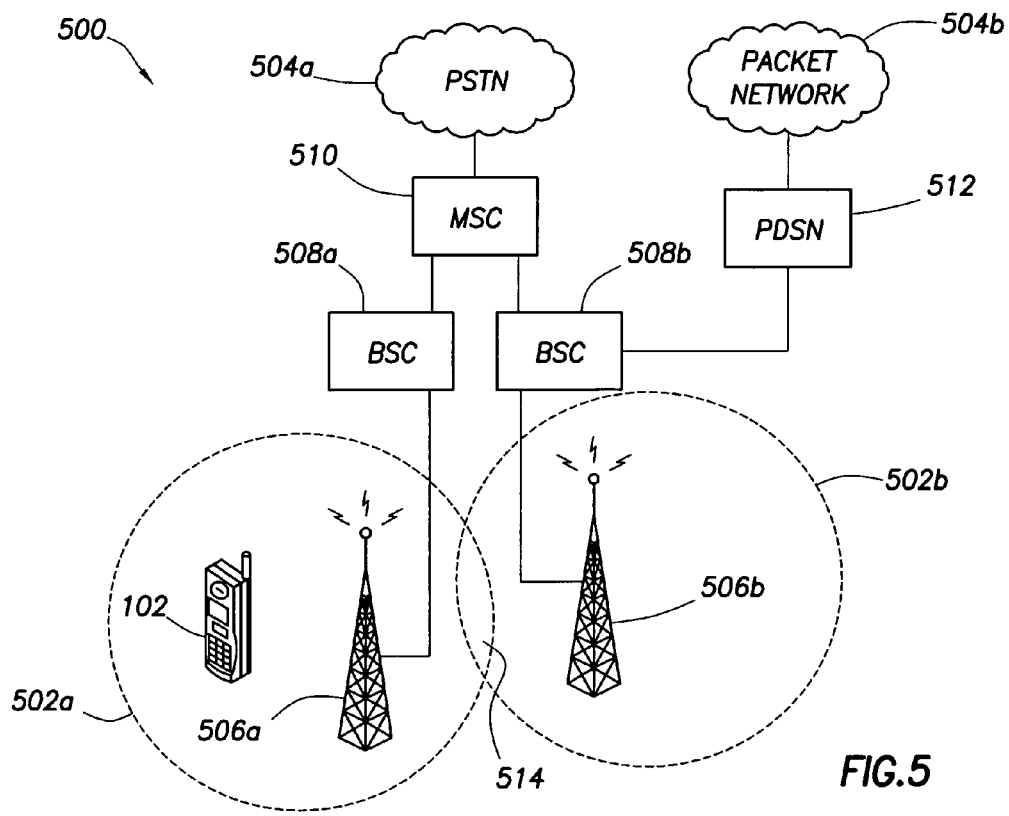
FIG. 5 is a diagram of a more detailed embodiment of the system of FIG. 1.

Referring to FIG. 5, in another embodiment, a communications network 500 illustrates a more detailed example of the system 100 of FIG. 1. In the present example, the network 500 is a CDMA network that may be compatible with a variety of standards including, but not limited to, Interim Standard 95 (IS-95), Interim Standard 2000 (IS-2000) and Universal Mobile Telecommunications System (UMTS). The network 500 may represent other technologies, including Global System for Mobile communication (GSM), and Orthogonal Frequency Division Multiplexing (OFDM). Accordingly, it is understood that the methods of the present disclosure may be performed in networks based on different technologies, such as High Rate Packet Data-based Radio Access Networks (HRPD-based RANs) and that the examples using a CDMA network are for purposes of illustration only. Furthermore, it is understood that various functions performed by the network 500, such as call authentication, pilot signal broadcast, etc., may be either digital or analog, and the network may include circuit switched technology as well as packet based technology.

The network 500 includes a plurality of cells 502a, 502b. In the present example, the network 500 is a wireless network, and may be connected to other wireless and/or wireline networks, such as a Public Switched Telephone Network (PSTN) 504a and a packet network 504b. Each cell 502a, 502b in the network 500 includes a base station (BS) 506a, 506b, respectively, that are coupled to base station controllers (BSC) 508a, 508b, respectively. A mobile switching center (MSC) 510 may be used to connect the network 500 with other networks such as the PSTN 504a. Although not shown, the base stations 506a and 506b may be coupled to the same BSC, and the BSCs 508a and 508b may be coupled to separate MSCs. The BSC 508b may be coupled to a packet-switched node 512 (e.g., a packet data node such as a packet data serving node (PDSN)) that is coupled to the packet network 504b.

The network 500 enables a client such as a terminal device 102 to communicate with another device (not shown) such as an emergency call center device via the BTS 506a associated with the cell 502a in which the terminal device is located. The cells 502a, 502b overlap so that the terminal device 102 may travel from one cell to another (e.g., from the cell 502a to the cell 502b) while maintaining a communication session. In a handoff region 514 (e.g., the area where the cells 502a, 502b overlap), the terminal device 102 may be serviced by both the BTS 506a and the BTS 506b.

Although illustrated in FIG. 5 as a cellular phone, it is understood that the terminal device 102 may be any device capable of participating in a communication session via a wireless or wired connection, and such devices may include telephones, computers, personal digital assistants, portable computers, pagers, and/or cellular phones, and such devices may be mobile or stationary. Furthermore, the network 500 may be a wired network and is not limited to a wireless network.

When the terminal device 102 needs to place an emergency call, a token may be required by the network 500 as previously described. If no token is provided, the call may be discarded before the call setup process is initiated within the network 500. For example, the BTS 506a may determine whether a valid token is present using functionality present with the BTS 506a or by forwarding a token elsewhere for validation. The BTS 506a may initiate the call setup process with the BSC 508a only after the token is validated.

It is understood that the functionality provided by the token generator 108 and token validator 110 of FIG. 1 may be included in various illustrated components of the network 500 or may be distributed throughout the network 500. Furthermore, in some embodiments, the token generator 108 and token identifier 110 may be separate from and coupled to the network 500.

It is understood that the terminal device 102 may travel between different networks. If this occurs, each network may issue its own tokens to the terminal device 102, or tokens already stored in the terminal device may be accepted by other networks. Furthermore, in some embodiments, an emergency response service request may be allowed without a token within certain parameters (e.g., one request to an emergency response service per day).

Figure 6:
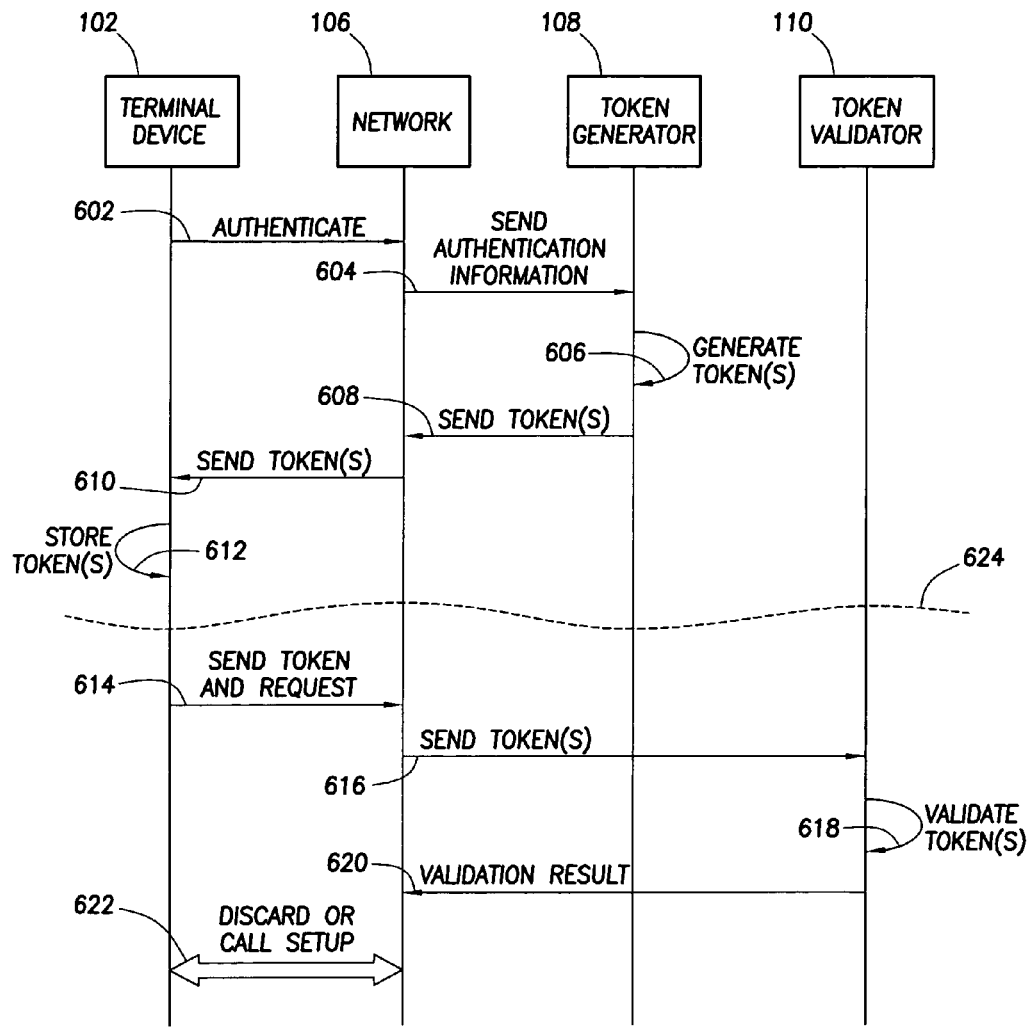
FIG. 6 is a sequence diagram illustrating one possible sequence of messages that may occur within the system of FIG. 1.

Referring to FIG. 6, in another embodiment, a sequence diagram 600 illustrates various messages that may be passed between components of FIG. 1 to protect emergency services. It is understood that the sequence diagram 600 illustrates the basic function provided by a message and does not provide actual message types or detailed message exchanges. Furthermore, as previously described, the token generator 108 and token validator 110 may be combined and may be included in the network 106. However, for purposes of clarity, they are illustrated as separate components.

In step 602, the terminal device 102 authenticates with the network 106, which sends at least a portion of the authentication information to the token generator 108 in step 604. In step 606, the token generator 108 generates one or more tokens for the terminal device 102 as previously described, and the tokens are sent to the terminal device in steps 608 and 610. In step 612, the terminal device 102 stores the tokens for future use.

As described above, the tokens may not be generated each time the terminal device 102 authenticates with the network 106. Accordingly, time may pass between the generation of the tokens and their actual use, as indicated by line 624. Although not shown, the terminal device 102 may authenticate with the network 106 multiple times during the time represented by line 624.

In step 614, the terminal device 102 requests a connection to an emergency response service and sends a token to the network 106. The network 106 sends the token to the token validator 110 in step 616. The token validator 110 validates the token (or fails to validate the token) in step 618 and sends the result of the validation to the network 106 in step 620. In step 622, the network 106 either discards the request if the validation failed or establishes the requested connection to the emergency response service if the validation was successful.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
    receiving information identifying a terminal device at a token generator within a communication network;
    generating a plurality of tokens by the token generator based on the information, wherein the tokens are used by the terminal device when placing emergency calls and each token contains sufficient validation information to uniquely identify the terminal device in the communication network, the plurality of tokens limiting a number of false emergency response service requests allowed for the terminal device;
    sending the generated tokens to the terminal device;
    receiving a token from the terminal device with a request from the terminal device to establish the emergency call;
    validating the emergency call originating from the terminal device using a token validator within the communication network;
    establishing the emergency call upon validation of the token and identification of the terminal device;
    generating a replacement token when the emergency call is not a false emergency response service request; and
    sending the replacement token to the terminal device for use for another emergency call.

2. The method of claim 1, wherein validating the emergency call comprises authenticating the terminal device within the communication network, wherein the information identifying the terminal device is obtained during the authentication.

3. The method of claim 1 further comprising discarding the request from the terminal device when one of the attempt to validate the token is not successful and the emergency call is a false emergency response service request.

4. The method of claim 1, wherein generating the replacement token comprises modifying the received token.

5. The method of claim 1 wherein the request includes the token.

6. The method of claim 1 wherein the token is only received from the terminal device if the emergency call is to be established using a packet based technology.

7. A method comprising:
    receiving a request for a connection to an emergency response service from a terminal device;
    receiving a token from the terminal device, wherein the token uniquely identifies the terminal device in a communication network without the need for other communications between the terminal device and the communication network;

determining by the communication network whether the token is one of a plurality of tokens generated for the terminal device, wherein the determination of whether the token is valid comprises determining whether the terminal device may be uniquely identified, the plurality of tokens limiting a number of false emergency response service requests allowed for the terminal device;

connecting the terminal device to the emergency response service for an emergency call only if the token is valid;

generating a replacement token when the emergency call is not a false emergency response service request; and sending the replacement token to the terminal device.

8. The method of claim 7 wherein determining by the communication network whether the token is valid includes evaluating the token using a predefined validation process.

9. The method of claim 7 wherein generating the replacement token comprises modifying the received token.

10. A method for use with a terminal device comprising:

receiving a plurality of tokens from a communication network, wherein each of the plurality of tokens includes validation information uniquely associated with the terminal device that is sufficient to identify the terminal device to the communication network without additional information from the terminal device, the plurality of tokens limiting a number of false emergency response service requests allowed for the terminal device;

storing the received tokens in a memory;

retrieving a token from the memory;

sending the token to the communication network when requesting a connection to an emergency response service, wherein the emergency response service is coupled to a device that validates the token and the terminal device prior to providing emergency services; and receiving a replacement token when the emergency call is not a false emergency response service request.

11. The method of claim 10 further comprising determining whether an outgoing call is attempting to connect to the emergency response service, wherein the token is only sent if the outgoing call is attempting to connect to the emergency response service.

12. The method of claim 10 further comprising issuing a notification if the memory does not contain at least one token.

13. The method of claim 10 wherein the token is sent only when requesting the connection to the emergency response service using a packet based technology.

14. The method of claim 13 wherein the packet based technology includes Voice over Internet Protocol technology.

15. The method of claim 10 wherein the token is included in a request message sent when requesting the connection to the emergency response service.

16. A system comprising:

a network configured to communicate with a client via a network interface;

a token generator coupled to the network and configured to generate a plurality of tokens based on information associated with the client, wherein each of the plurality of tokens contains sufficient information for the network to independently validate the client when a request to establish an emergency call is sent by the client to the network, the plurality of tokens limiting a number of false emergency response service requests allowed for the terminal device; and a token validator coupled to the network and configured to perform a validation process on a token when the token is sent by the client in the request to establish the emergency call to the network over the network interface, wherein the validation process is performed using at least one processor, wherein the network is configured to establish the emergency call when the token is validated, and send a replacement token to the client when the emergency call is not a false emergency response service request.

17. The system of claim 16 wherein the token generator and the token validator are contained within the network.

18. The system of claim 16 wherein the network includes a packet based communication technology.

19. The system of claim 18 wherein the packet based communication technology includes Voice over Internet Protocol technology.

20. The system of claim 16 wherein the token is linked to one of a plurality of users of the client.

21. The system of claim 16 wherein the token is generated using a hashing process.

22. The system of claim 16 wherein the token is generated using a nonce.

* * * * *